US012602010B2

(12) United States Patent
Kawata et al.

(10) Patent No.: US 12,602,010 B2
(45) Date of Patent: Apr. 14, 2026

(54) INFORMATION DISPLAY MECHANISM, TIMEPIECE MOVEMENT, AND TIMEPIECE

(71) Applicant: SEIKO WATCH KABUSHIKI KAISHA, Tokyo (JP)

(72) Inventors: Masayuki Kawata, Tokyo (JP); Ken Sato, Tokyo (JP); Katsuya Mugishima, Tokyo (JP)

(73) Assignee: SEIKO WATCH KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 18/496,476

(22) Filed: Oct. 27, 2023

(65) Prior Publication Data

US 2024/0176300 A1 May 30, 2024

(30) Foreign Application Priority Data

Nov. 30, 2022 (JP) ................................ 2022-191471

(51) Int. Cl.

| | |
|---|---|
| ***G04B 19/20*** | (2006.01) |
| ***G04B 19/253*** | (2006.01) |
| ***G04C 3/14*** | (2006.01) |
| ***G04C 17/00*** | (2006.01) |

(52) U.S. Cl.

CPC ..... *G04B 19/202* (2013.01); *G04B 19/25306* (2013.01); *G04C 3/14* (2013.01); *G04C 17/0066* (2013.01)

(58) Field of Classification Search

CPC ................ G04B 19/202; G04B 19/253; G04B 19/25306

See application file for complete search history.

(56) References Cited

U.S. PATENT DOCUMENTS

| | | | | |
|---|---|---|---|---|
| 6,278,661 | B1 | 8/2001 | Higuchi et al. | |
| 2018/0173164 | A1* | 6/2018 | Robin | G04B 19/2532 |
| 2019/0324406 | A1* | 10/2019 | Tezuka | G04C 3/146 |
| 2020/0019123 | A1* | 1/2020 | Nobe | G04C 3/143 |
| 2020/0096944 | A1* | 3/2020 | Hashizume | G04C 3/146 |
| 2020/0249627 | A1* | 8/2020 | Papi | G04B 19/08 |
| 2020/0249630 | A1* | 8/2020 | Sakai | H02P 8/18 |
| 2021/0116867 | A1* | 4/2021 | Kawata | G04C 3/146 |
| 2021/0208538 | A1* | 7/2021 | Takano | G04B 11/04 |
| 2021/0223743 | A1* | 7/2021 | Baba | G04G 9/0076 |
| 2022/0113678 | A1* | 4/2022 | Fleury | G04B 11/006 |

* cited by examiner

*Primary Examiner* — Edwin A. Leon
*Assistant Examiner* — Jason M Collins
(74) *Attorney, Agent, or Firm* — Crowell & Moring LLP

(57) ABSTRACT

There are provided an information display mechanism, a timepiece movement, and a timepiece each capable of achieving a reduction in space. The information display mechanism includes a display wheel which has a plurality of inner teeth, on which information is displayed, and which has a ring-like shape, a driving wheel having a plurality of tooth parts configured to mesh with the inner teeth, and a drive section configured to rotate the driving wheel. The driving wheel is configured to rotate in a state in which the tooth parts and the inner teeth mesh with each other to thereby rotate the display wheel. The display wheel is provided with a regulatory protruding part configured to regulate mesh with the driving wheel. The drive section is configured to rotate the driving wheel in a first direction and a second direction opposite to the first direction.

10 Claims, 13 Drawing Sheets

INFORMATION DISPLAY MECHANISM, TIMEPIECE MOVEMENT, AND TIMEPIECE

RELATED APPLICATIONS

This application claims priority to Japanese Patent application No. JP2022-191471, filed on Nov. 30, 2022, the entire content of which is incorporated herein by reference.

BACKGROUND OF THE INVENTION

1. Field of the Invention

The present invention relates to an information display mechanism, a timepiece movement, and a timepiece.

2. Description of the Related Art

As a timepiece capable of displaying not only time but also other information, there exists a timepiece with, for example, a calendar mechanism. The calendar mechanism is provided with, for example, a date plate, a photosensor mechanism, and a date plate drive mechanism. The date plate has a date indication and a detection pattern. The photosensor mechanism reads the detection pattern. The date plate drive mechanism drives the date plate in response to a signal from the photosensor mechanism (see, e.g., WO99/034264A (Patent Document 1)).

The photosensor mechanism has a light emitting section and a light receiving section. The light from the light emitting section is reflected or not reflected in accordance with the detection pattern of the date plate. The light receiving section detects the reflection or the non-reflection of the light. The timepiece recognizes an end of month based on the detection result in the light receiving section to perform a month-end correction of the calendar.

In the timepiece described in Patent Document 1, since the calendar mechanism is provided with the photosensor mechanism, an installation space becomes large in some cases. Therefore, there is a room for improvement in reduction in space for the calendar mechanism.

SUMMARY OF THE INVENTION

It is an aspect of the present application to provide an information display mechanism, a timepiece movement, and a timepiece each capable of achieving the reduction in space.

An information display mechanism according to the application includes a display wheel which has a plurality of inner teeth, on which information is displayed, and which has a ring-like shape, a driving wheel having a plurality of tooth parts configured to mesh with the inner teeth, and a drive section configured to rotate the driving wheel, wherein the driving wheel is configured to rotate in a state in which the tooth parts and the inner teeth mesh with each other to thereby rotate the display wheel, the display wheel is provided with a regulatory protruding part configured to regulate mesh with the driving wheel, and the drive section is configured to rotate the driving wheel in a first direction and a second direction opposite to the first direction.

According to this configuration, since the structure for confirming the fact that the display wheel has reached the reference position is simple, it is possible to achieve a reduction in space.

It is preferable for the regulatory protruding part to have a locking recessed part to which the tooth part locks in a non-meshed state.

According to this configuration, it is possible to stably lock the tooth part to the regulatory inner tooth.

It is preferable for the display wheel to be a date indicator configured to display a plurality of date characters as the information.

According to this configuration, since the date characters are displayed as the information, it is possible to provide the timepiece movement with a function as a calendar.

It is preferable for the plurality of date characters to be displayed side by side in a circumferential direction of the display wheel, and for the regulatory protruding part to be formed at a position corresponding to the date character located at a last in an arrangement direction out of the plurality of date characters.

This configuration is preferable in performing the month-end correction of the calendar.

It is preferable for the drive section to be a two-coil motor including a rotor configured to rotate the display wheel, a stator configured to generate a rotative force in the rotor, a first coil configured to supply a magnetic flux to one of both ends of the stator, and a second coil configured to supply a magnetic flux to another of the both ends of the stator.

According to this configuration, it is possible to make the display wheel stably perform rotations in both directions (positive/negative rotations). Therefore, deadlock (a state in which driving is unachievable) in the state in which the driving wheel has reached the regulatory inner tooth is difficult to occur. Therefore, it is possible to improve the operation stability of the movement.

A timepiece movement according to the application is provided with the information display mechanism.

According to this configuration, it is possible to provide the timepiece movement capable of achieving the reduction in space for the information display mechanism.

A timepiece according to application is provided with the timepiece movement.

According to this configuration, it is possible to provide the timepiece capable of achieving the reduction in space for the information display mechanism.

According to the application, it is possible to provide an information display mechanism, a timepiece movement, and a timepiece each capable of achieving the reduction in space.

DETAILED DESCRIPTION OF THE PREFERRED EMBODIMENTS

Some embodiments of the invention will hereinafter be described based on the drawings. It should be noted that in the following description, constituents having the same functions or similar functions are denoted by the same reference symbols. Further, the redundant descriptions of those constituents are omitted in some cases.

First Embodiment

In general, a mechanical body including a driving portion of a timepiece is referred to as a "movement." A state in which a dial and hands are attached to the movement, and then the movement is put into a timepiece case to form a completed product, which is referred to as a "complete" of the timepiece. Out of both sides of a main plate constituting a substrate of the timepiece, a side (i.e., a side at which the dial is located) at which a glass of the timepiece case is located is referred to as a "reverse side" of the movement. Further, out of the both sides of the main plate, a side (i.e., a side opposite to the dial) at which a case back of the timepiece case is located is referred to as an "surface side" of the movement.

Figure 1:
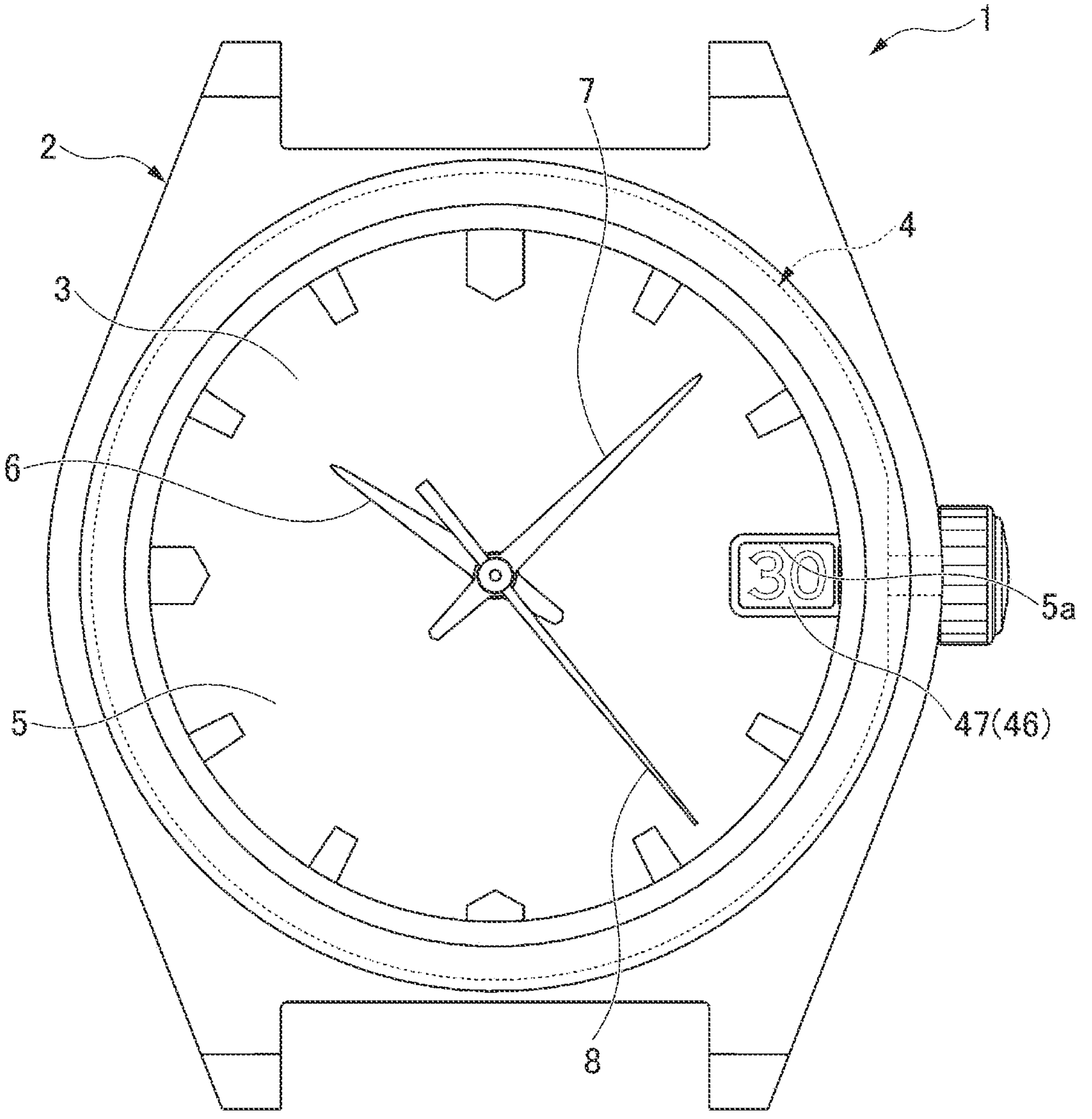
FIG. 1 is an external view of a timepiece according to a first embodiment.

FIG. 1 is an exterior view of the timepiece according to a first embodiment.

As shown in FIG. 1, the complete of the timepiece 1 according to the first embodiment is provided with a movement 4 (a timepiece movement), a dial 5 having a scale, an hour hand 6 (an indicating hand), a minutes hand 7, and a seconds hand 8 (an indicating hand) inside a timepiece case 2 constituted by a case back not shown and a glass 3. On the dial 5, there opens a date window **5*a* for clearly showing a date character 47 displayed on a date indicator 46 (a display wheel). Thus, the timepiece 1** makes it possible to confirm the date in addition to the time.

Figure 2:
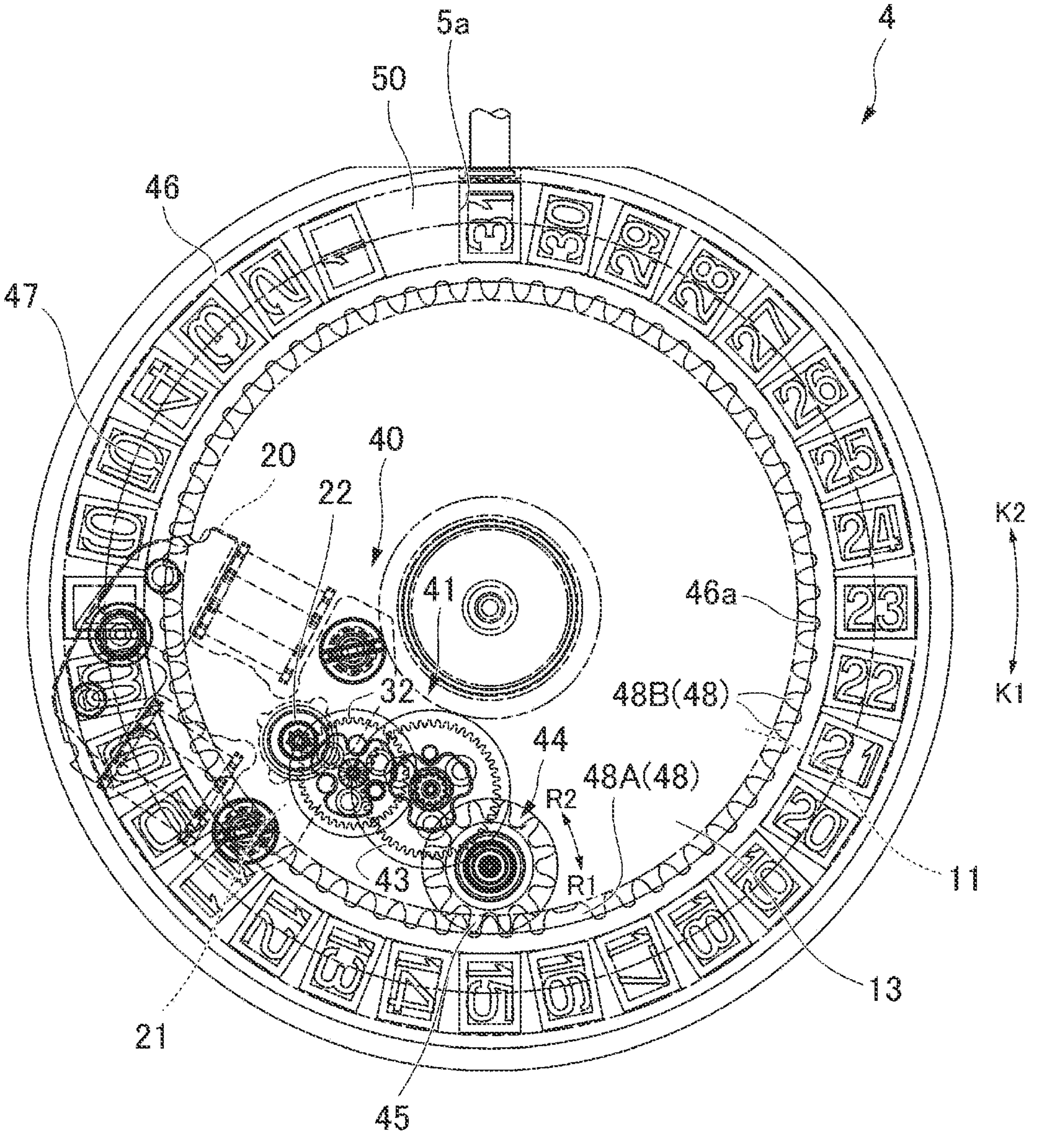
FIG. 2 is a plan view of a movement according to the first embodiment.
Figure 3:
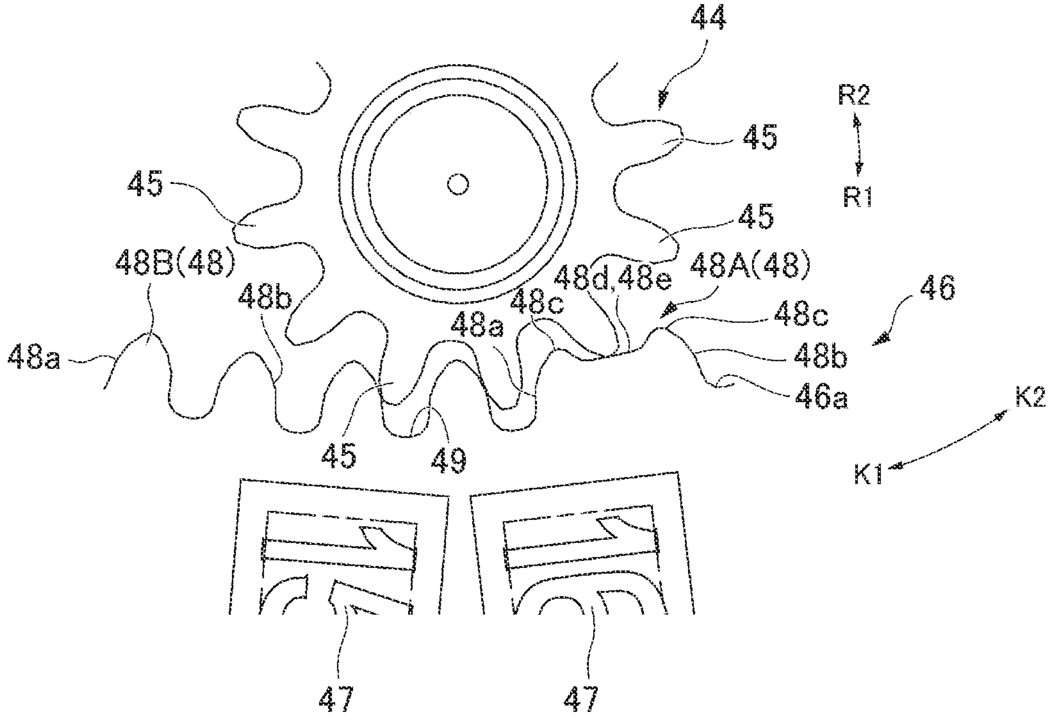
FIG. 3 is an enlarged plan view of the movement according to the first embodiment.
Figure 4:
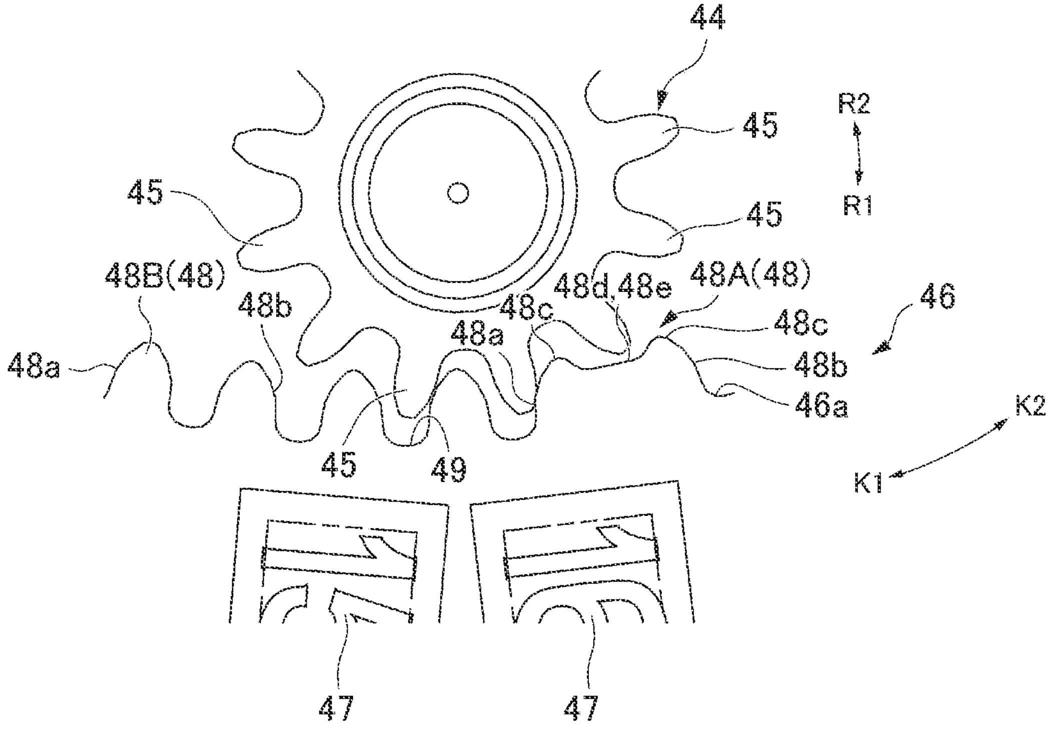
FIG. 4 is an enlarged plan view of the movement according to the first embodiment.

FIG. 2 is a plan view of the movement according to the first embodiment. FIG. 3 and FIG. 4 are each an enlarged plan view of the movement.

As shown in FIG. 2, the movement 4 is mainly provided with a main plate 11, a train wheel bridge, an indicating hand motor, an indicating hand train wheel, a second train wheel group, a calendar mechanism 40 (an information display mechanism), and a date indicator guard plate 13.

The main plate 11 forms a substrate of the movement 4. The train wheel bridge is arranged at the obverse side of the main plate 11. The date indicator guard plate 13 is arranged at the reverse side of the main plate 11. The indicating hand train wheel transmits a rotation of a rotor of the indicating hand motor to the hour hand 6 (the indicating hand).

The calendar mechanism 40 is provided with a calendar motor 20 (a drive section), a calendar train wheel 41, a date indicator driving wheel 44 (a driving wheel), and the date indicator 46.

The calendar motor 20 is a stepping motor having a stator 21 and a rotor 22. The calendar motor 20 generates power for rotating the date indicator 46. The rotor 22 of the calendar motor 20 is provided with a pinion.

The calendar train wheel 41 transmits a rotation of the rotor 22 of the calendar motor 20 to the date indicator driving wheel 44. The calendar train wheel 41 is provided with a first hour intermediate wheel 32 and a date indicator driving intermediate wheel 43. The first hour intermediate wheel 32 and the date indicator driving intermediate wheel 43 are rotatably supported by the main plate 11. The first hour intermediate wheel 32 meshes with the pinion of the rotor 22. The date indicator driving intermediate wheel 43 meshes with the first hour intermediate wheel 32.

The date indicator driving wheel 44 is rotatably supported by the main plate 11 between the main plate 11 and the date indicator guard plate 13. The date indicator driving wheel 44 has a plurality of tooth parts 45. The tooth parts 45 protrude outward in a radial direction of the date indicator driving wheel 44. The tooth parts 45 are formed so as to be able to mesh with feed teeth of the date indicator driving intermediate wheel 43. The date indicator driving wheel 44 rotates by the feed teeth of the date indicator driving intermediate wheel 43 entering a rotational locus of the date indicator driving wheel 44 to mesh with the date indicator driving wheel 44. Therefore, the date indicator driving wheel 44 intermittently rotates due to the rotation of the date indicator driving intermediate wheel 43. The date indicator driving wheel 44 rotates the date indicator 46.

The date indicator 46 is a plate like member having a ring-like shape (an annular shape) rotatably attached to the main plate 11. A circumferential direction of the date indicator 46 is referred to as a "circumferential direction." A radial direction of the date indicator 46 is referred to as a "radial direction."

The date indicator 46 is pressed by the date indicator guard plate 13. On the reverse surface of the date indicator 46, there is displayed a plurality of date characters 47 (information) as date information. The plurality of date characters 47 are formed side by side at intervals in the circumferential direction. The date indicator 46 exposes the date character 47 through the date window **5*a* of the dial 5 to thereby display the date information (see FIG. 1). The date characters 47 can be formed on the date indicator 46** with printing, embossing, pasting, or the like.

The plurality of date characters 47 are formed side by side in the circumferential direction of the date indicator 46. The plurality of date characters 47 include, for example, totally 31 date characters from "1" as the first date character to "31" as the last date character. The date characters 47 representing "1" through "31" are arranged in this order. The character "1" represents the first date of a month. The character "31" represents the last date of a month. The character "31" is the date character 47 located at the last in the arrangement direction.

In the date indicator 46, a blank 50 is formed between "1" and "31" out of the plurality of date characters 47. The blank 50 is a region where the date characters 47 are not formed.

An inner circumferential edge **46*a* of the date indicator 46 is provided with a plurality of inner teeth 48 at intervals throughout the entire circumference. The inner teeth 48 protrude inward in the radial direction of the date indicator 46**.

As shown in FIG. 3, the inner teeth 48 are capable of meshing with the date indicator driving wheel 44. By the tooth parts 45 entering and then meshing with meshing recessed parts 49 each formed between the inner teeth 48 adjacent with each other, the date indicator 46 rotates in tandem with the rotation of the date indicator driving wheel 44. The date indicator 46 intermittently rotates due to the rotation of the date indicator driving intermediate wheel 43.

The expression that "the inner teeth 48 mesh with the date indicator driving wheel 44" means the state in which the inner teeth 48 enter the meshing recessed parts 49, and thus, the date indicator 46 is capable of rotating due to the rotation of the date indicator driving wheel 44.

The inner teeth 48 each have a first tilted surface 48*a* facing to a first rotational direction K1 (a clockwise direction) of the date indicator 46 and a second tilted surface 48*b* facing to a second rotational direction K2 (a counterclockwise direction) of the date indicator 46. The first tilted surface 48*a* is, for example, a tilted surface tilted so as to proceed toward the first rotational direction K1 as proceeding outward in the radial direction. The second tilted surface 48*b* is, for example, a tilted surface tilted so as to proceed toward the second rotational direction K2 as proceeding outward in the radial direction. The inner teeth 48 can have a shape gradually narrowing in width (a dimension in the circumferential direction) inward in the radial direction. The inner teeth 48 can have a line-symmetric shape having an axis of symmetry along the radial direction.

One of the inner teeth 48 is a regulatory inner tooth 48A. The regulatory inner tooth 48A has a shape of regulating meshing between the inner teeth 48 and the date indicator driving wheel 44. The regulatory inner tooth 48A protrudes inward in the radial direction of the date indicator 46 from the inner circumferential edge 46*a* of the date indicator 46. The regulatory inner tooth 48A is an example of a regulatory protruding part (a regulatory structure). In the following description, the inner teeth 48 other than the regulatory inner tooth 48A are referred to as "inner teeth 48B" in some cases.

The regulatory inner tooth 48A is large in width compared to the inner teeth 48B. The regulatory inner tooth 48A has a shape obtained by joining the two inner teeth 48B adjacent to each other. Specifically, the regulatory inner tooth 48A has two apexes 48*c* at a distance in the circumferential direction of the date indicator 46. The apexes 48*c* protrude inward in the radial direction of the date indicator 46. The distance between the apexes 48*c* is the same as a distance between the apexes of the two inner teeth 48B adjacent to each other. A protruding height (a protruding height from the inner circumferential edge 46*a* of the date indicator 46) of the apexes 48*c* is the same as the protruding height of the inner teeth 48B.

A protruding height (a protruding height from the inner circumferential edge 46*a* of the date indicator 46) of a part (an intermediate part 48*d*) between the apexes 48*c* of the regulatory inner teeth 48A is lower than the protruding height of the apexes 48*c*. Therefore, the intermediate part 48*d* forms a locking recessed part 48*e* formed between the two apexes 48*c*. The intermediate part 48*d* has the protruding height enough to prevent the entrance of the inner teeth 48B to the extent of making it possible to rotate the date indicator 46.

It is desirable for the locking recessed part 48*e* to be a recessed part having a depth to the extent that the tooth parts 45 can be locked in a non-meshed state. Since the locking recessed part 48*e* is capable of locking the tooth parts 45 in the non-meshed state, it becomes easy to keep the state in which the tooth parts 45 are locked to the regulatory inner tooth 48A.

In FIG. 3, the tooth parts 45 are locked in the non-meshed state to the locking recessed part 48*e*. This state is a state in which the mesh between the inner teeth 48 and the date indicator driving wheel 44 is regulated. This state is referred to as a "gear meshing regulation state." In the gear meshing regulation state, the date indicator driving wheel 44 cannot rotate in a first direction R1 (the clockwise direction). Therefore, it is also unachievable for the date indicator 46 to rotate in the first rotational direction K1.

It is desirable for the locking recessed part 48*e* to have a width in a range in which the tooth parts 45 can rotate also in a second direction R2 (the counterclockwise direction) within the meshing recessed part 49 after the tooth parts 45 becomes in the gear meshing regulation state (see FIG. 3) as shown in FIG. 4. Thus, even when there is a variation in shapes of the tooth parts and the inner teeth 48, it is possible to make the date indicator driving wheel 44 and the date indicator 46 stably perform rotational actions.

It should be noted that the regulatory inner tooth (the regulatory protruding part, the regulatory structure) sufficiently has a structure capable of preventing the date indicator from rotating in the first rotational direction by regulating the mesh with the tooth part of the date indicator driving wheel, but is not particularly limited in shape and so on.

Figure 6:
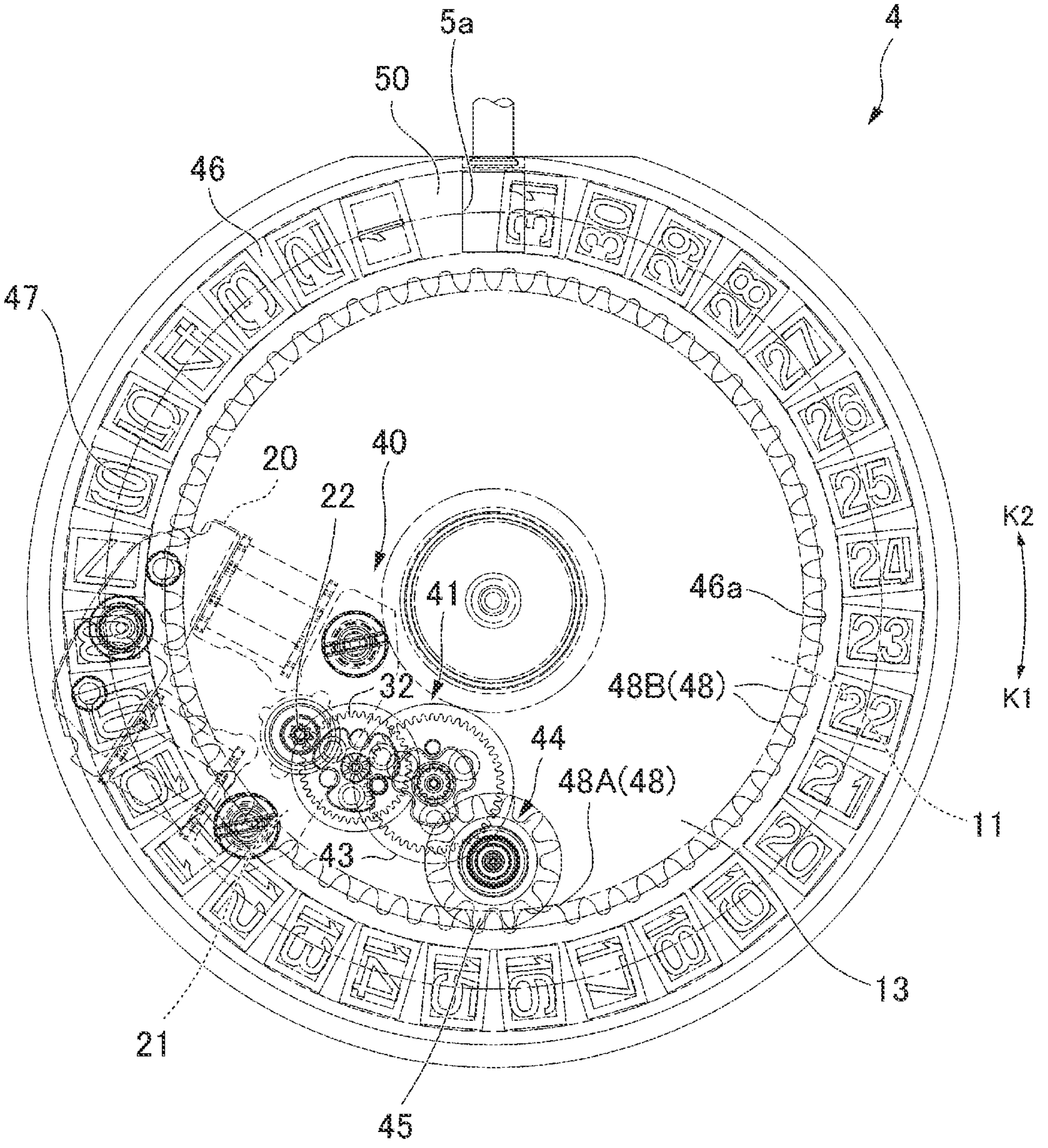
FIG. 6 is a plan view showing an operation of the movement according to the first embodiment.

As shown in FIG. 2, the regulatory inner tooth 48A is formed at a position corresponding to "31" located at the last in the arrangement direction out of the plurality of date characters 47. In particular, as shown in, for example, FIG. 6, the regulatory inner tooth 48A is formed at a position where the date indicator driving wheel 44 becomes in the gear meshing regulation state at a position (a reference position of the date indicator 46) at which the date indicator 46 is located when the date indicator 46 further rotates in the first rotational direction K1 after ending the display of "31" in the date window 5*a*.

At this position, a part of the date window 5*a* reaches the blank 50. Since a part of the date window 5*a* displays the blank 50 when the date indicator 46 reaches the reference position, it is possible for the user to visually confirm with ease that the date indicator 46 has reached the reference position.

Figure 5:
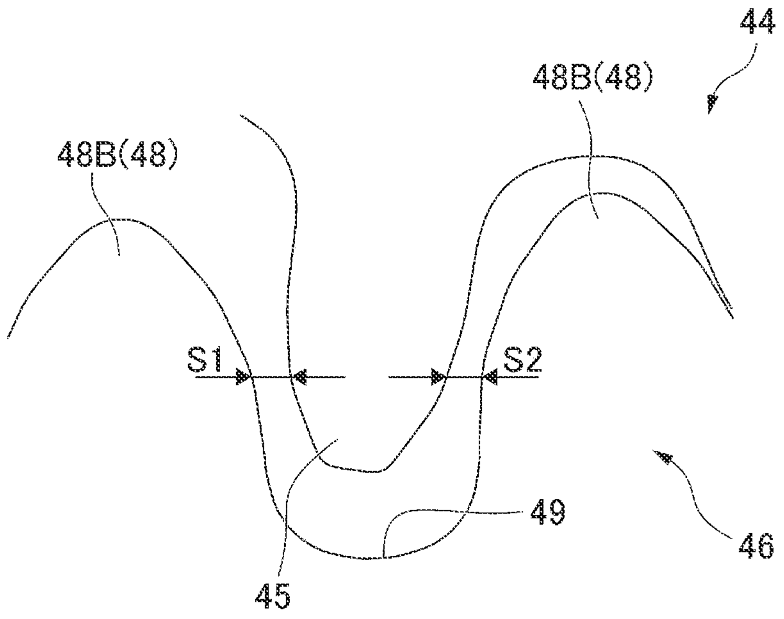
FIG. 5 is an enlarged plan view of a date indicator driving wheel and a date indicator.

FIG. 5 is an enlarged plan view of the date indicator driving wheel 44 and the date indicator 46.

As shown in FIG. 5, when the tooth part 45 of the date indicator driving wheel 44 enters the meshing recessed part 49 (the recessed part between the inner teeth 48 adjacent to each other) of the date indicator 46, it is desirable for a gap between the tooth part 45 and the inner teeth 48 in the meshing recessed part 49 to be no smaller than 0 mm and no larger than 0.3 mm. The gap is a sum of gaps S1, S2 at both sides of the tooth part 45. By setting the gap between the tooth part 45 and the inner teeth 48 in the range described above, it is possible to make the date indicator driving wheel 44 and the date indicator 46 stably operate.

The second train wheel group is provided with a train wheel for transmitting a rotation of a rotor of a second motor to the seconds hand 8 and the minute hand 7 (see FIG. 1).

Figure 7:
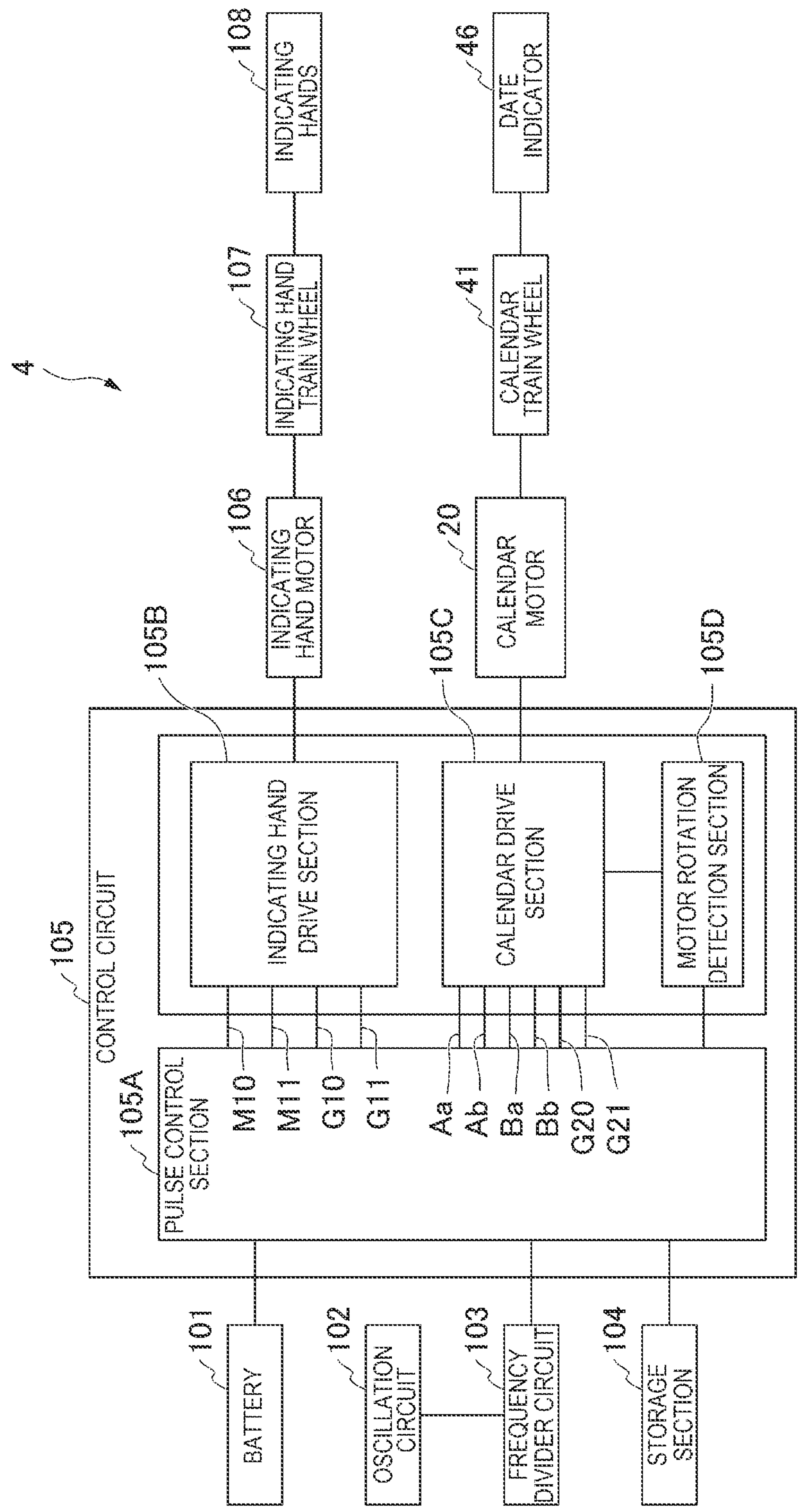
FIG. 7 is a block diagram of the movement according to the first embodiment.

FIG. 7 is a block diagram of the movement 4.

As shown in FIG. 7, the movement 4 is provided with a battery 101, an oscillation circuit 102, a frequency divider circuit 103, a storage section 104, a control circuit 105, an indicating hand motor 106, the calendar motor 20, an indicating train wheel 107, the calendar train wheel 41, indicating hands 108, and the date indicator 46.

The control circuit 105 is provided with a pulse control section 105A, an indicating hand drive section 105B, a calendar drive section 105C, and a motor rotation detection section 105D.

The battery 101 supplies the control circuit 105 with electrical power. The battery 101 is preferably a button battery made of, for example, a lithium cell or a silver oxide cell. The battery 101 can also be a secondary cell such as a solar cell.

The oscillation circuit 102 is a passive element used for performing the oscillation with a predetermined frequency (e.g., 32 kHz) using a piezoelectric phenomenon of, for example, a quartz crystal.

The frequency divider circuit 103 divides the frequency of a signal with the predetermined frequency output by the oscillation circuit 102 into a desired frequency, and then outputs the signal thus divided in frequency to the control circuit 105.

The storage section 104 stores main drive pulses of the indicating hand drive section 105B and the calendar drive section 105C. The storage section 104 stores auxiliary drive pulses. The storage section 104 stores search pulses for motor rotation detection.

The control circuit 105 performs a time measurement using the desired frequency obtained by the frequency division by the frequency divider circuit 103. The control circuit 105 drives the indicating hand motor 106 and the calendar motor 20 in accordance with the result of the time measurement. The control circuit 105 detects a back electromotive voltage (an inductive voltage) generated by the rotation of the calendar motor 20, and then detects the reference position of the date indicator 46 based on the result of the detection.

The pulse control section 105A performs the time measurement using the desired frequency obtained by the frequency division by the frequency divider circuit 103. The pulse control section 105A generates the pulse signal so as to make the indicating hands 108 and the date indicator 46 operate in accordance with the result of the time measurement. The pulse control section 105A outputs the pulse signal thus generated to the indicating hand drive section 105B and the calendar drive section 105C. The pulse control section 105A obtains a detection result of the motor rotation detection section 105D based on a comparison result between the inductive voltage of the calendar motor 20 detected by the calendar drive section 105C and the reference voltage. The pulse control section 105A performs detection of the reference position of the date indicator 46 based on the detection result thus obtained.

A drive terminal M10, a drive terminal M11, a control terminal G10, and a control terminal G11 of the pulse control section 105A are connected to the indicating hand drive section 105B. A first terminal Aa, a second terminal Ab, a first terminal Ba, a second terminal Bb, a control terminal G20, and a control terminal G21 of the pulse control section 105A are connected to the calendar drive section 105C. A detection terminal of the pulse control section 105A is connected to the motor rotation detection section 105D.

The motor rotation detection section 105D detects a back electromotive voltage generated in the calendar drive section 105C in accordance with a rotational state of the calendar motor 20. The motor rotation detection section 105D outputs a result of a comparison of the back electromotive voltage thus detected with the reference voltage Vcomp as a threshold value to the pulse control section 105A. The pulse control section 105A is capable of detecting the rotational state of the calendar motor 20 based on the comparison result.

Figure 8:
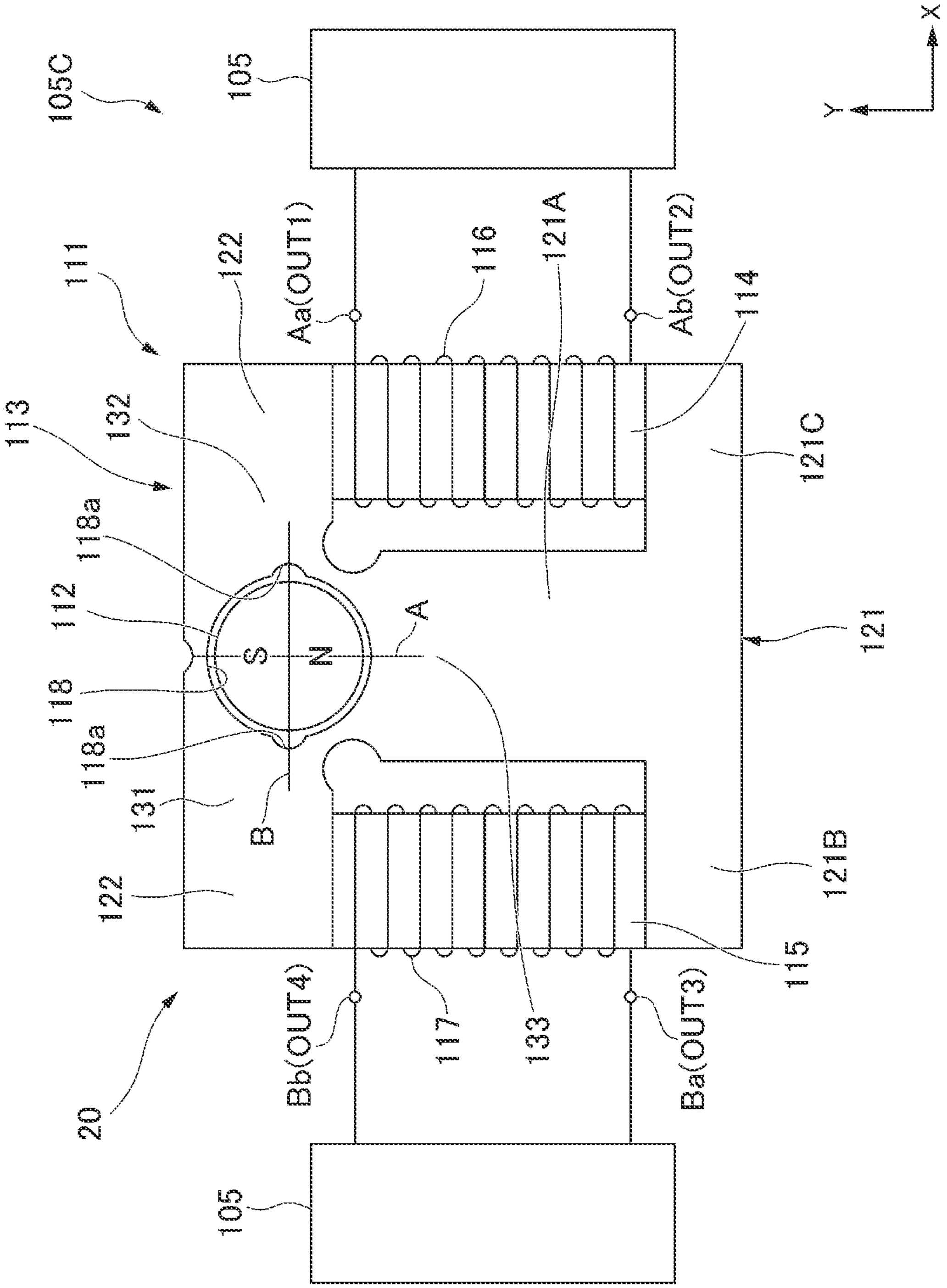
FIG. 8 is a configuration diagram of an example of a calendar drive section and a calendar motor.

FIG. 8 is a configuration diagram of an example of the calendar drive section 105C and the calendar motor 20.

As shown in FIG. 8, the calendar motor 20 is, for example, a two-coil motor. The two-coil motor is provided with a stator 111 and a rotor 112. The two-coil motor operates every unit step to rotate the date indicator 46 (see FIG. 2). The stator 111 is provided with a stator main body 113, a first magnetic core 114 (a first end) magnetically coupled to the stator main body 113, a second magnetic core 115 (a second end), a first coil 116 wound around the first magnetic core 114, and a second coil 117 wound around the second magnetic core 115.

The stator main body 113 is formed of a plate member using a high magnetic permeability material such as permalloy. The stator main body 113 has a first yoke 121 having a T-shape, and a pair of second yokes 122. The first yoke 121 is provided with a linear portion 121A, and flared portions 121B, 121C extending from one end portion of the linear portion 121A toward both sides. The pair of second yokes 122 respectively extend from the other end portion of the linear portion 121A toward the both sides. The extending direction of the linear portion 121A is a Y direction. The extending direction of the flared portions 121B, 121C is an X direction. The X direction is perpendicular to the Y direction.

The other end portion of the linear portion 121A is provided with a rotor housing hole 118. On an inner circumferential surface of the rotor housing hole 118, there are formed a pair of recessed parts 118*a* so as to be opposed to each other. The recessed parts 118*a* each function as a positioning part for determining a stopping position of the rotor 112. The rotor 112 is housed in the rotor housing hole 118. The rotor 112 becomes the lowest in potential energy and stably stops when being located at a position where a magnetic pole axis A is perpendicular to a straight line B passing through the pair of recessed parts 118*a*, namely a position where the magnetic pole axis A extends along the Y direction. The stopping position of the rotor 112 when the magnetic pole axis A of the rotor 112 extends along the Y direction, and at the same time, an N pole of the rotor 112 faces to the first yoke 121 side is referred to as a first stopping position. The stopping position of the rotor 112 when the magnetic pole axis of the rotor 112 extends along the Y direction, and at the same time, an S pole of the rotor 112 faces to the first yoke 121 side is referred to as a second stopping position.

The first magnetic core 114 and the second magnetic core 115 are formed of a high magnetic permeability material such as permalloy. The first magnetic core 114 is magnetically coupled to a tip portion of the flared portion 121C and a tip portion of the second yoke 122. The second magnetic core 115 is magnetically coupled to a tip portion of the flared portion 121B and a tip portion of the second yoke 122. Both end portions of each of the first magnetic core 114 and the second magnetic core 115 are coupled to the stator main body 113.

The stator main body 113 has three magnetic pole parts on the periphery of the rotor housing hole 118. In particular, the stator main body 113 has a first magnetic pole part 131, a second magnetic pole part 132, and a third magnetic pole part 133. The first magnetic pole part 131 is located at a position corresponding to one of the second yokes 122 on the periphery of the rotor 112. The second magnetic pole part 132 is located at a position corresponding to the other of the second yokes 122 on the periphery of the rotor 112. The third magnetic pole part 133 is located at a position corresponding to the linear portion 121A of the first yoke 121 on the periphery of the rotor 112.

The first coil 116 is wound around the first magnetic core 114. The first coil 116 is magnetically coupled to the second magnetic pole part 132 and the third magnetic pole part 133. The first coil 116 has the first terminal Aa and the second terminal Ab. The first coil 116 is wound so that a magnetic field from the flared portion 121C side toward the second yoke 122 is generated in the first coil 116 when making an electrical current flow from the first terminal Aa toward the second terminal Ab.

The second coil 117 is wound around the second magnetic core 115. The second coil 117 is magnetically coupled to the first magnetic pole part 131 and the third magnetic pole part 133. The second coil 117 has the first terminal Ba and the second terminal Bb. The second coil 117 is wound so that a magnetic field from the second yoke 122 side toward the flared portion 121B is generated in the second coil 117 when making an electrical current flow from the first terminal Ba toward the second terminal Bb.

It is preferable for a wire diameter of a conductive wire of the first coil 116 to be the same as a wire diameter of a conductive wire of the second coil 117. It is preferable for the number of turns of the first coil 116 to be the same as the number of turns of the second coil 117. The terminals of the first coil 116 and the second coil 117 are connected to the control circuit.

A potential of the first terminal Aa of the first coil 116 is defined as OUT1. A potential of the second terminal Ab of the first coil 116 is defined as OUT2. A potential of the first terminal Ba of the second coil 117 is defined as OUT3. A potential of the second terminal Bb of the second coil is defined as OUT4.

A magnetic flux generated in the first coil 116 or the second coil 117 flows along the first magnetic core 114 and the second magnetic core 115, and the stator main body 113. Polarities of the first magnetic pole part 131, the second magnetic pole part 132, and the third magnetic pole part 133 are switched in accordance with an energization state to the first coil 116 or the second coil 117.

The two-coil motor is provided with the rotor 112, the stator 111, the first coil 116, and the second coil 117. The stator 111 applies a magnetic flux for generating a rotational force to the rotor 112. The rotor 112 is magnetized to an N-pole and an S-pole. The rotor 112 rotates the date indicator 46. The first coil 116 supplies the magnetic flux to one (the first magnetic core 114) of both ends of the stator 111. The second coil 117 supplies the magnetic flux to the other (the second magnetic core 115) of the both ends of the stator 111.

The drive pulse output by the pulse control section 105A (see FIG. 7) excites the first coil 116 and the second coil 117 to thereby drive the rotor 112 as much as a reference rotational angle corresponding to the number of poles.

It should be noted that the reference rotational angle corresponding to the number of poles mentioned here can be an angle obtained by dividing the angle corresponding to one revolution of the rotor 112 by the number of poles to which the rotor 112 is magnetized. For example, when the rotor 112 is magnetized to two poles, the reference rotational angle corresponding to the number of poles is an angle (180°) obtained by dividing the angle corresponding to one revolution by 2. When the rotor 112 is magnetized to four poles, the reference rotational angle corresponding to the number of poles is an angle (90°) obtained by dividing the angle corresponding to one revolution by 4.

Figure 9:
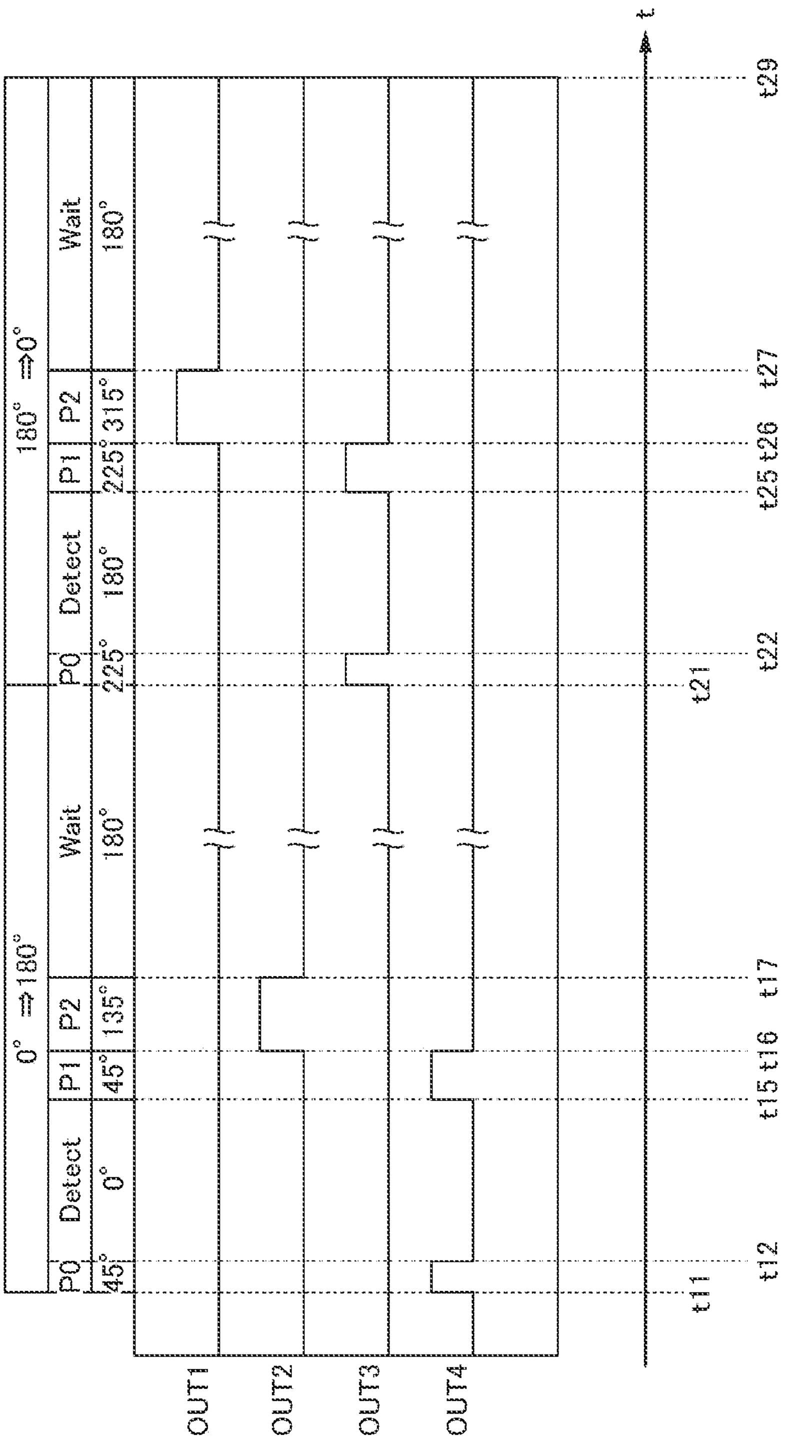
FIG. 9 is a diagram showing an example of a method of driving the calendar motor.

FIG. 9 is a diagram showing an example of a method of driving the calendar motor 20.

The horizontal axis in FIG. 9 represents time. "OUT1" represents the magnitude of a voltage to be applied to the first terminal OUT1 at each time point. "OUT2" represents the magnitude of a voltage to be applied to the second terminal OUT2 at each time point. "OUT3" represents the magnitude of a voltage to be applied to the third terminal OUT3 at each time point. "OUT4" represents the magnitude of a voltage to be applied to the fourth terminal OUT4 at each time point.

The position of the rotor 112 at each time point will be described defining the second stopping position described above as 0 degree. The control in a period from a time point t11 through a time point t21 is control of rotating the rotor 112 counterclockwise from 0 degree to 180 degrees. The control in a period from a time point t21 through a time point t29 is control of rotating the rotor 112 counterclockwise from 180 degrees to 0 degree.

In a period from the time point t11 through a time point t12, the control circuit 105 (see FIG. 7) applies a pulse in a positive direction to the fourth terminal OUT4. When the pulse in the positive direction continues to be applied to the fourth terminal OUT4, the rotor 112 stops at a position which the rotor 112 reaches when rotating as much as 45 degrees. When the control circuit 105 stops applying the pulse at the time point t12, the rotor 112 is pulled back to the position at 0 degree, and then stops there.

When the rotor 112 returns to the position at 0 degree from the position at 45 degrees, the rotor 112 repeats an action of rotating counterclockwise at least once to a position at a negative rotational angle due to inertia, and then rotating clockwise to a position at a positive rotational angle. The rotor 112 vibrates, and then the vibration attenuates, and thus, the rotor 112 stops at the position at 0 degree.

In a period from the time point t12 through a time point t15, the control circuit 105 determines a mechanical load applied to the rotor 112 due to an application of an oscillation pulse. Specifically, the pulse control section 105A obtains the detection result of the motor rotation detection section 105D based on the comparison result between the inductive voltage of the calendar motor 20 detected by the calendar drive section 105C and the reference voltage. The pulse control section 105A performs the detection of the reference position of the date indicator 46 based on the detection result thus obtained.

In a period from the time point t15 through a time point t17, the control circuit 105 applies the drive pulse. The pulse in the positive direction to be applied to the fourth terminal OUT4 in a period from the time point t15 through a time point t16 is described as a first drive pulse. The pulse in the positive direction to be applied to the second terminal OUT2 in a period from the time point t16 through a time point t17 is described as a second drive pulse. When the pulse in the positive direction continues to be applied to the second terminal OUT2, the rotor 112 stops at a position which the rotor 112 reaches when rotating as much as 135 degrees. When the control circuit 105 stops applying the pulse at the time point t17, the rotor 112 stops at the position at 180 degrees.

In a period from the time point t21 through a time point t22, the control circuit 105 applies a pulse in a positive direction, namely the oscillation pulse, to the third terminal OUT3. When the pulse in the positive direction continues to be applied to the third terminal OUT3, the rotor 112 stops at a position which the rotor 112 reaches when rotating as much as 225 degrees. When the control circuit 105 stops applying the pulse at the time point t22, the rotor 112 is pulled back to the position at 180 degrees, and then stops. Here, the rotor 112 vibrates when returning from the position at 225 degrees to the position at 180 degrees, and then the vibration attenuates, and thus, the rotor 112 stops there.

In a period from the time point t22 through a time point t25, the control circuit 105 determines the mechanical load applied to the rotor 112 due to the application of the oscillation pulse. The pulse control section 105A obtains the detection result of the motor rotation detection section 105D based on the comparison result between the inductive voltage of the calendar motor 20 detected by the calendar drive section 105C and the reference voltage. The pulse control section 105A performs the detection of the reference position of the date indicator 46 based on the detection result thus obtained.

In a period from the time point t25 through a time point t27, the control circuit 105 applies the drive pulse. Specifically, in a period from the time point t25 through a time point t26, the control circuit 105 applies the pulse in the positive direction to the third terminal OUT3 as the first drive pulse. In a period from the time point t26 through the time point t27, the control circuit 105 applies the pulse in the positive direction to the first terminal OUT1 as the second drive pulse.

When the pulse in the positive direction continues to be applied to the first terminal OUT1, the rotor 112 stops at a position which the rotor 112 reaches when rotating as much as 315 degrees. When the control circuit 105 stops applying the pulse at the time point t26, the rotor 112 stops at the position at 0 degree.

Due to the drive pulses and the pulse timings hereinabove described, it is possible to perform the rotation detection of the calendar motor 20.

Figure 10:
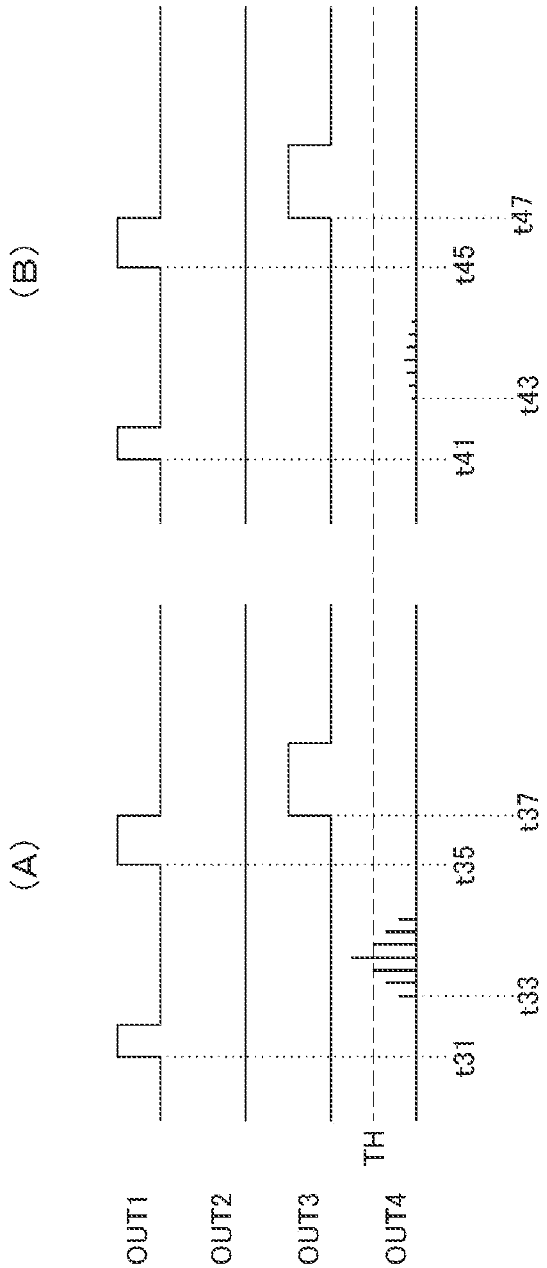
FIG. 10 is a diagram showing an example of a method of detecting a rotation of the calendar motor.

FIG. 10 is a diagram showing an example of a method of detecting the rotation of the calendar motor 20. The method of detecting the rotation of the calendar motor 20 will hereinafter be described. As the detection state of the calendar (the date indicator) position, there are sited a timing by a detection mode configuration by a user operation, a periodic position detection timing by the control circuit 105, and so on, but the detection state is not limited here since a variety of timings are conceivable in accordance with the specification of the timepiece.

As mentioned above, one method of detecting the reference position of the date indicator 46 is to determine and determine the mechanical load received by the rotor 112 by the application of oscillation pulses by the control circuit 105.

In FIG. 10, the horizontal axis represents the time. "OUT1" represents the magnitude of the voltage to be applied to the first terminal OUT1 at each time point. "OUT2" represents the magnitude of the voltage to be applied to the second terminal OUT2 at each time point. "OUT3" represents the magnitude of the voltage to be applied to the third terminal OUT3 at each time point. "OUT4" represents the magnitude of the voltage to be applied to the fourth terminal OUT4 at each time point.

First, with reference to FIG. 10A, there will be described when the inductive voltage detection has been successful.

The inner teeth 48 of the date indicator 46 mesh with the date indicator driving wheel 44. Therefore, the mechanical load is low, and the date indicator driving wheel 44 and the date indicator 46 rotate stably (see FIG. 2).

At a time point t31, the control circuit 105 controls "OUT4" to thereby apply the oscillation pulse to the two-coil motor. The control circuit 105 is to determine and determine the mechanical load applied to the rotor 112 due to the application of the oscillation pulse.

The calendar drive section 105C detects the inductive voltage generated in "OUT4." The motor rotation detection section 105D determines the mechanical load applied to the rotor 112 based on the voltage detected by the calendar drive section 105C. Since the inductive voltage is no lower than a threshold value TH, the motor rotation detection section 105D determines that the inductive voltage has normally been detected, and thus, recognizes that the rotor 112 is in a rotating state.

Then, with reference to FIG. 10B, there will be described when the inductive voltage detection has failed.

At a time point t41, the control circuit 105 controls "OUT4" to thereby apply the oscillation pulse to the two-coil motor. The control circuit 105 is to determine and determine the mechanical load applied to the rotor 112 due to the application of the oscillation pulse.

When the tooth part 45 of the date indicator driving wheel 44 stops in the non-meshed state with the regulatory inner tooth 48A (see FIG. 3), the calendar drive section 105C detects the inductive voltage generated in "OUT4." Since the inductive voltage is no higher than the threshold value TH, the motor rotation detection section 105D determines that the inductive voltage has failed to normally be detected. The control circuit 105 recognizes that the rotor 112 is not rotating, and identifies the reference position of the date indicator 46.

At the time point when it is confirmed that the date indicator 46 has reached the reference position, the control circuit 105 can rotate the date indicator 46 in the second rotational direction K2 (the counterclockwise direction) to thereby return (see FIG. 2) the date indicator 46 to an initial position (a position where "1" is displayed in the date window 5*a*).

In the calendar mechanism 40 in the present embodiment, since one of the inner teeth 48 of the date indicator 46 is the regulatory inner tooth 48A for regulating the mesh with the date indicator driving wheel 44, it is possible to regulate the rotation of the date indicator 46 when the date indicator driving wheel 44 has reached the regulatory inner tooth 48A. The calendar mechanism 40 is simple in the structure for confirming that the date indicator 46 has reached the reference position, and can therefore achieve the reduction in space compared to the structure of detecting the position of the date indicator using a photosensor mechanism or the like.

The calendar mechanism 40 can detect the position of the date indicator 46 using the structure (the regulatory inner tooth 48A) of the date indicator 46, and can therefore reduce arithmetic processing and so on of the detection result compared to a structure of detecting the position of the date indicator using the photosensor mechanism or the like. Therefore, there is an advantage that it is possible to simplify the arithmetic processing in the control circuit 105.

Since the regulatory inner tooth 48A has the locking recessed part 48*e* for locking the tooth part 45 of the date indicator driving wheel 44, it is possible to stably lock the tooth part 45 to the regulatory inner tooth 48A. Therefore, it becomes easy to detect the reference position of the date indicator 46.

Since the date indicator 46 displays the date character 47 as information, it is possible to provide the movement 4 with a function as a calendar.

The regulatory inner tooth 48A is formed at a position corresponding to the date character "31" located at the last in the arrangement direction out of the plurality of date characters 47, which is preferable in performing the month-end correction of the calendar.

The calendar motor 20 is the two-coil motor, and can therefore make the date indicator 46 stably perform the rotations in the both directions (positive/negative rotations). Therefore, deadlock (a state in which driving is unachievable) in the state in which the date indicator driving wheel 44 has reached the regulatory inner tooth 48A is difficult to occur. Therefore, it is possible to improve the operation stability of the movement 4.

The date indicator 46 is provided with the blank 50 formed between "1" and "31" out of the plurality of date characters 47 (see FIG. 2). Since a part of the date window 5*a* displays the blank 50 when the date indicator 46 reaches the reference position, it is possible for the user to visually confirm with ease that the date indicator 46 has reached the reference position. As described above, it is possible for the calendar mechanism 40 to visually express the fact that the date indicator 46 is in the position detection state.

Since the movement 4 is provided with the calendar mechanism 40, the structure for confirming the fact that the date indicator 46 has reached the reference position is simple. Therefore, it is possible to achieve the reduction in space compared to the structure of detecting the position of the date indicator with the photosensor mechanism or the like.

Since the timepiece 1 (see FIG. 1) is provided with the movement 4, the structure for confirming the fact that the date indicator 46 has reached the reference position is simple. Therefore, it is possible to achieve the reduction in space compared to the structure of detecting the position of the date indicator with the photosensor mechanism or the like.

Second Embodiment

Figure 11:
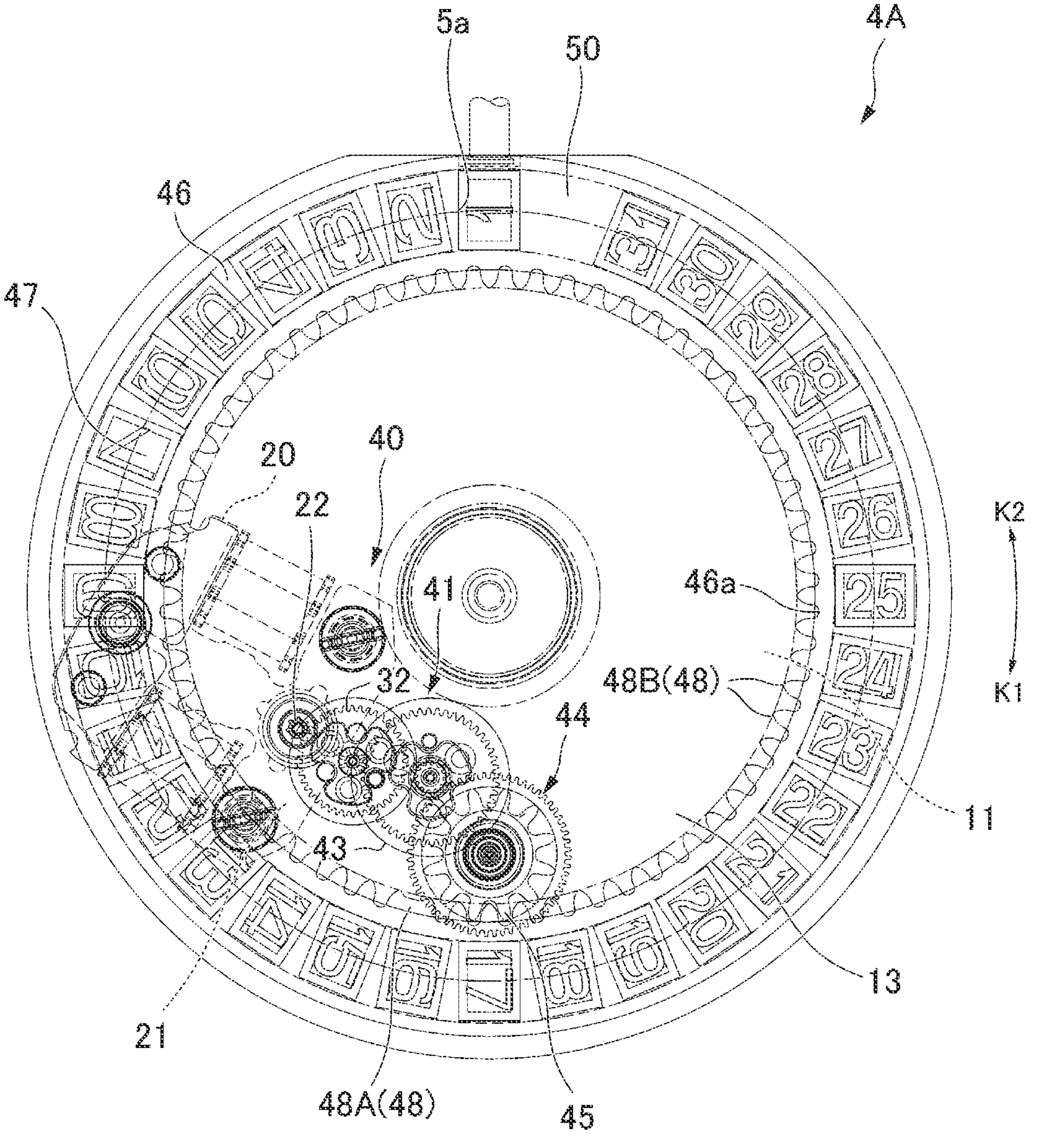
FIG. 11 is a plan view of a movement according to a second embodiment.
Figure 12:
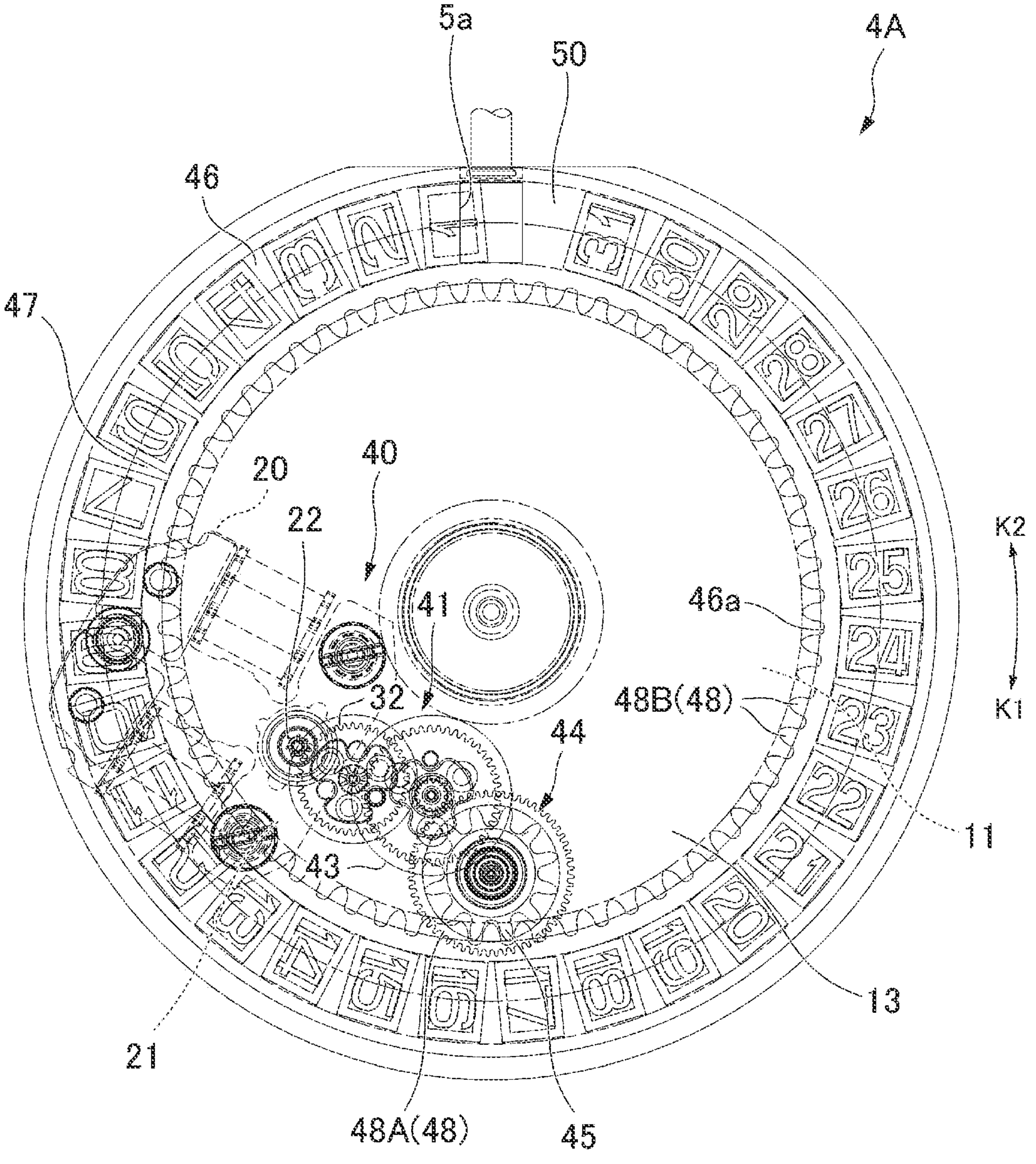
FIG. 12 is a plan view of a movement according to the second embodiment.

FIG. 11 and FIG. 12 are each a plan view of a movement according to a second embodiment.

As shown in FIG. 11, in the movement 4A according to the second embodiment, the regulatory inner tooth 48A is formed at a position corresponding to "1" out of the plurality of date characters 47.

As shown in FIG. 12, the regulatory inner tooth 48A is formed so that the date indicator driving wheel 44 becomes in the gear meshing regulation state at a position (the reference position of the date indicator 46) slightly shifted from the display of "1" in the date window 5*a*.

Third Embodiment

Figure 13:
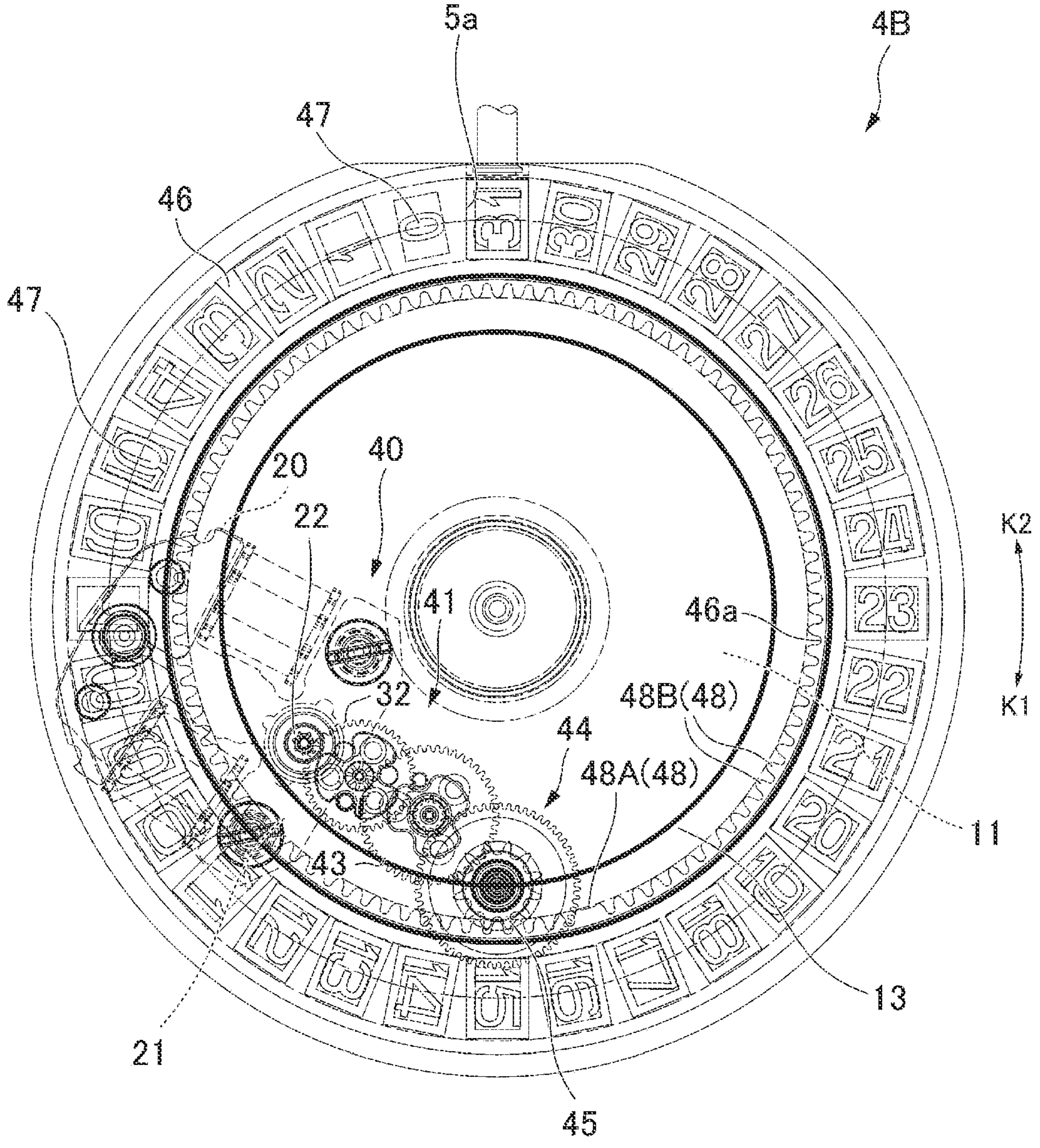
FIG. 13 is a plan view of a movement according to a third embodiment.
Figure 14:
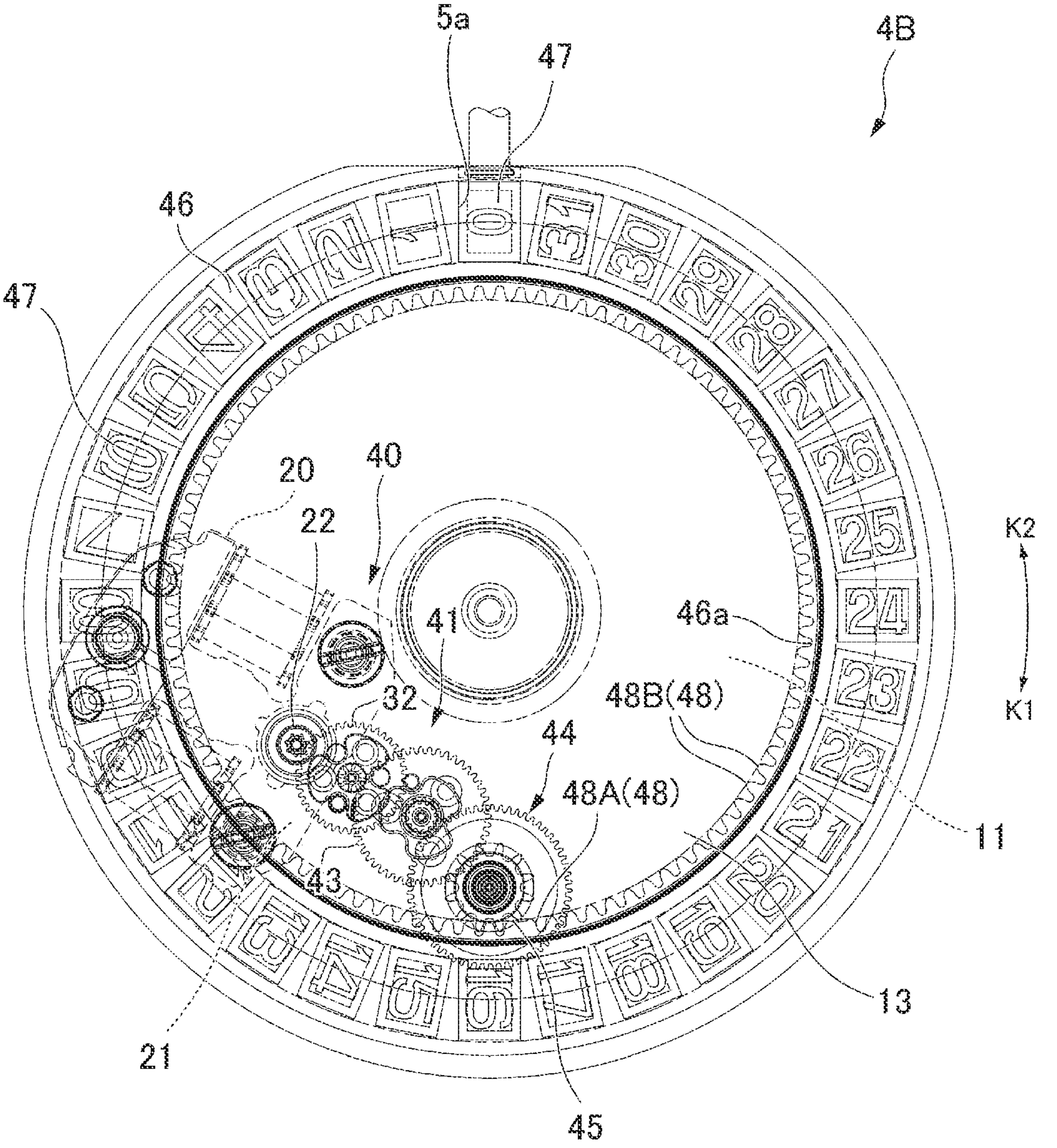
FIG. 14 is a plan view of a movement according to the third embodiment.

FIG. 13 and FIG. 14 are each a plan view of a movement according to a third embodiment.

As shown in FIG. 13, the movement 4B according to the third embodiment is different from the movement 4 (see FIG. 2) according to the first embodiment in the point that "0" is formed as the date character 47 instead of the blank 50.

As shown in FIG. 14, the regulatory inner tooth 48A is formed so that the date indicator driving wheel 44 becomes in the gear meshing regulation state at a position (the reference position of the date indicator 46) at which "0" is displayed in the date window 5*a*.

In the movement 4B, since the date window 5*a* displays "0" when the date indicator 46 reaches the reference position, it is possible for the user to visually confirm with ease that the date indicator 46 has reached the reference position. Therefore, it is possible to express that fact that the date indicator 46 is in the position detection state without a feeling of strangeness.

It should be noted that the present disclosure is not limited to the above embodiments described with reference to the drawings, but a variety of modified examples can be cited within the technical scope or the spirit of the present disclosure.

For example, in the movement 4 shown in FIG. 2, the display wheel is the date indicator 46 for displaying the date character 47, but the information displayed by the display wheel is not limited to the date characters. It is possible to apply a day indicator for displaying a day of the week as the information as the display wheel, or it is possible to adopt the display wheel for displaying a variety of types of information besides the day of the week. The information displayed by the display wheel can be a temperature (e.g., a body temperature), altitude, an amount of activity (activity), or the like.

The description is presented in the embodiments citing a mechanical timepiece as an example, but the configuration described above can be applied to, for example, a quartz type timepiece. In this case, for example, it is possible to rotate the wheels using driving force of a stepping motor.

Although the single regulatory inner tooth 48A is used in the embodiments, the number of regulatory inner teeth is not particularly limited. The number of the regulatory inner teeth can be two or more (an arbitrary number no smaller than two).

It is sufficient for the regulatory protruding part to regulate the mesh with the driving wheel, and does not have a limitation in presence or absence of the function as the inner tooth.

What is claimed is:

1. An information display mechanism comprising:

an annular display wheel which has a plurality of inner teeth, wherein the annular display wheel has indications of days of a month arranged circularly in series along the annular display wheel, and further wherein the plurality of inner teeth includes a regulatory protrusion formed differently from a rest of the plurality of inner teeth and positioned at a particular location in the series;

a driving wheel having a plurality of outer teeth configured to mesh with the inner teeth of the annular display wheel; and a motor operable to rotate the driving wheel to thereby rotate the annular display wheel, wherein the regulatory protrusion of the annular display wheel is formed such that an engagement of one of the plurality of outer teeth of the driving wheel with the regulatory protrusion locks the annular display wheel from rotating in a first direction, and wherein the motor is operable to rotate the annular display wheel in a second direction opposite to the first direction to free the annular display wheel from being locked with said one of the plurality of outer teeth of the driving wheel.

2. The information display mechanism according to claim 1, wherein the regulatory protrusion is formed to have a locking recess in which said one of the outer teeth is locked to prevent the annular display wheel from further rotating in the first direction.

3. The information display mechanism according to claim 1, wherein the annular display wheel is formed with a date indicator that displays numbers indicative dates of a month.

4. The information display mechanism according to claim 3, wherein the numbers indicative of the dates of a month are arranged circularly in series along the annular display wheel, and the regulatory protrusion is positioned at a location in the series that corresponds to a particular date of a month.

5. The information display mechanism according to claim 1, wherein the motor is a two-coil motor including a rotor operable to rotate the annular display wheel, a stator configured to generate a rotating force to rotate the rotor, a first coil configured to supply a magnetic flux to one of ends of the stator, and a second coil configured to supply a magnetic flux to the other of the ends of the stator.

6. A timepiece movement comprising the information display mechanism according to claim 1.

7. A timepiece comprising the timepiece movement according to claim 6.

8. The information display mechanism according to claim 1, wherein the regulatory protrusion of the annular display wheel is formed to have a circumferential length generally qual to a circumferential length to cover two adjacent inner teeth of the rest of the plurality of inner teeth of the annular display.

9. The information display mechanism according to claim 8, wherein the rest of the plurality of inner teeth of the annular display wheel are arranged at an angular interval around the annular display wheel, and the regulatory protrusion of the annular display wheel is formed to have two peaks and a valley running between the two peaks, wherein the two peaks are arranged at the angular interval.

10. The information display mechanism according to claim 9, wherein a depth of the valley measured from the tops of the two peaks is shorter than a depth of a bottom between two adjacent inner teeth of the rest of the plurality of the inner teeth.

* * * * *